Nov. 9, 1965  W. D. FLEGAL  3,216,292
PARALLEL EDGE BROKEN PIPE OR BOLT EXTRACTOR
Filed March 20, 1964
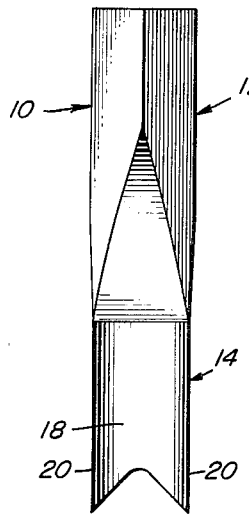
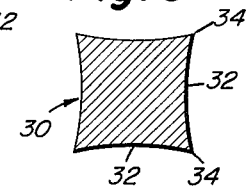
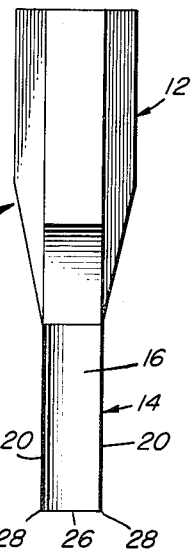
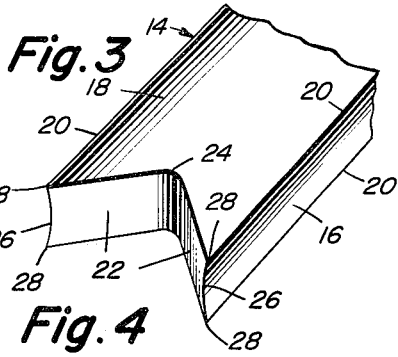
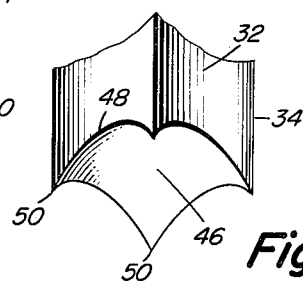
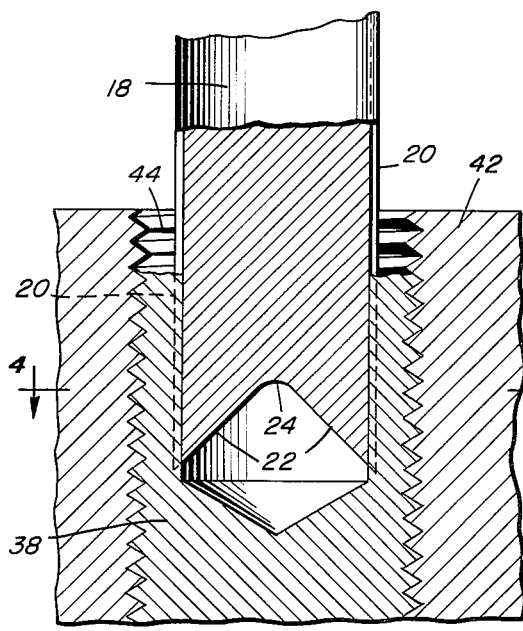
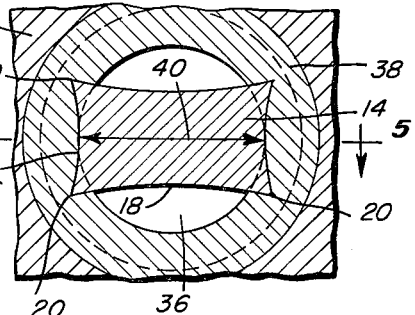
INVENTOR.
William D. Flegal
BY United States Patent Office 3,216,292
Patented Nov. 9, 1965

1

3,216,292
PARALLEL EDGE BROKEN PIPE OR
BOLT EXTRACTOR
William D. Flegal, 2924 Sunset Ave., Waukegan, Ill.
Filed Mar. 20, 1964, Ser. No. 353,538
5 Claims. (Cl. 81—53)

This invention relates to a parallel edge broken pipe or bolt extractor, and has for an object to provide a tool or extractor for use in extracting broken off pipes or studs from a member into which the pipe or bolt or screw was originally threaded for operative connection therewith, the term "stud" as hereinafter used including a threaded screw, threaded stud bolt, threaded pipe or threaded nipple, or the like.

It is the customary practice in removing broken and embedded studs from a block or the like, to first drill a straight-sided hole in the center of the stud, parallel to its longitudinal axis, and of a sufficient length therein to permit the insertion of the extracting tool. The diameter of the hole drilled in the stud may vary according to the diameter of the stud and of the extractor to be used. Into this hole is inserted an extracting tool, i.e., a tool that will make it possible to apply torque to the broken stud and remove it from the hole in which it is embedded.

This method of first drilling and then subsequently backing out the broken stud is used because every effort is made to avoid damaging the female threads in the block, thus leaving them in condition for the insertion of a new unbroken stud of standard size and thread, thus eliminating the undesirable and costly job of re-drilling and re-tapping these female threads for an oversize stud.

A further object of this invention is to provide an extractor of the chisel type which causes either no expansion of the broken stud, or at most, causes only negligible expansion, either as the extractor is driven into the existing hole in the pipe or nipple, or the suitably drilled hole in the screw or bolt, or as the broken stud is being removed.

In brief, this invention is for the purpose of providing a tool for extracting a threaded stud from a threaded aperture in another member. This extractor includes a shank from which an elongate blade integrally extends, the blade having rectangular sides, which sides are hollow ground to a concave surface. The concave side surfaces meet in sharp, longitudinally extending parallel edges which are parallel to the axis of the elongate blade. The blade terminates in oppositely disposed chisel cutting points and chisel cutting edges, which edges extend transversely of the axis of the blade. The terminal surface of the blade between the two chisel cutting edges is recessed. When inserted in a hollowed broken stud or a broken hollow threaded pipe section, which is located in a threaded aperture in another member, the sharp chisel cutting points and edges chisel a surface within the hollow of the broken stud or pipe, which is complementary to the concave sides and parallel edges, chiselling the metal away from the inner surface of the hollow broken stud or pipe and avoiding any lateral displacement of the metal or any enlargement of the diameter of the stud or pipe which would make it grip the member from which it is to be extracted, even more tightly, rather than loosening it therefrom.

With the above and related objects in view, this invention consists in the details of construction and combination of parts, as will be more fully understood from the following description, when read in conjunction with the accompanying drawings in which:

FIG. 1 is a side elevational view of one form of the stud extractor of this invention.

FIG. 2 is an elevation at right angles to FIG. 1;

2

FIG. 3 is a perspective view of the chisel ends of the extractor blade, on enlarged scale.

FIG. 4 is an enlarged sectional view on line 4—4 of FIG. 1;

FIG. 5 is an enlarged partly section view of the extractor blade in operative position, on line 5—5 of FIG. 4.

FIG. 6 is a section through an extractor blade that is square in cross section.

FIG. 7 is a perspective view of the chisel end of FIG. 6.

There is shown at 10 the stud extractor of this invention. The extractor 10 is made of an elongate piece of tool steel, which may be hexagonal, or rectangular in cross section, the term "rectangular" also including "square" except where otherwise specified, The extractor 10 is here shown as made from an elongate piece of tool steel stock hexagonal in cross section, one elongate end being left in its original elongate hexagonal shape, providing a shank at 12, and the other end portion being ground or forged into an integrally extending extractor blade 14.

The blade 14 is made rectangular in cross section, with the four sides of the rectangle being equal, as in a square, as shown in FIGS. 6 and 7, with two of the sides shorter than the other two sides, as shown in FIGS. 1 to 5 inclusive, but the principles of this invention are found in both forms.

Referring now to the form shown in FIGS. 1 to 5, the rectangular blade 14 has two of its opposite sides 16 shorter than the other two sides 18. Both sets of sides 16 and 18 are not flat, but are hollow ground and thus are concave surfaces, as clearly brought out in FIG. 5 (the concavity of the sides being exaggerated, as shown, for clarity of illustration). Due to this hollow grinding, all these sides 16 and 18 meet in parallel, elongated sharp edges 20.

The terminal surface of the blade is recessed by grinding two diverging surfaces 22 therein preferably at approximately a forty-five degree angle to each other. Two diverging surfaces 22 meet each other in a smooth, preferably circular curve 24, the radius of the curve 24 being preferably not less than that of the tool used in grinding this curve 24, thus facilitating the manufacture thereof. Also, the surfaces 22 are flat, plane surfaces, and thus may be made by a cylindrical grinding tool, extending transversely of the elongate axis of the blade 14.

This construction results in providing two chisel cutting edges 26, each edge 26 ending in a chisel point 28. As seen in FIG. 2, all of both chisel edges 26 are in the same flat plane, although the perspective view in FIG. 3 may cause these edges to appear to be curved, such apparent curve being the result of the concavity of the shorter rectangular sides 16.

In the form shown in FIG. 6, the blade 30 is square in cross section, with four equal sides 32, similarly hollow ground to provide concave surfaces meeting in elongate parallel sharp edges 34. The terminal surface is recessed between the opposite sides 32, but may be spherically hollow ground at 46 if desired, to provide four terminal similar chisel cutting edges 48 and chisel points 50, and operating in the same manner as does the form of blade at 14. However, these chisel edges are necessarily somewhat curved, but still operate in the same manner as the straight chisel edges 26.

In operation, the extractor of this invention may be manufactured in sets to accommodate pipe from one-eighth inch to one inch, and the same set would accommodate bolts or studs from three-eighths of an inch to one and one-half inches, but it is practical to make the extractor in any size that may be needed. When extracting a broken bolt or screw, a hole 36 is first drilled into the broken bolt or screw 38 to a depth from two to three times the depth of the curve 24 from the chisel edges 22, and of a diameter substantially equal to the distance shown at 40 between the mid points of the concave sides 16. When a broken pipe or nipple is to be extracted, a blade will be selected wherein this distance 40 is substantially equal to the diameter of the opening in the broken pipe or nipple.

To extract the broken stud 38 from the member 42, such as an engine block or other member, in which the broken stud 38 is held by the threads 44, after the hole 36 is drilled into the stud, if not already present as in a pipe or nipple, an extractor blade 14, of appropriate size, as set forth above, is forced down into the hole or open end of the pipe or nipple a distance equal to two or three times the axial depth between the curve 24 and the chisel edges 26, causing the chisel points 28 and chisel cutting edges 26 to chisel or gouge into the inner surface of the hole or opening, the chiseled cuttings being pushed into the hole in the stud. The elongate parallel sharp edges 20 cut slots in the stud to provide a dug-in, secure grip on the inner surfaces of the wall of the hole therein. Then a wrench or other appropriate turning tool is applied to the polygonal shank 12, here shown as hexagonal, and the broken stud is unthreaded until it is removed without damage to the member threads, so that a new stud may readily be placed therein, to restore the member 42 for normal use.

The rectangular blade is used in most sizes, the two short side chisel cutting edges 26 and chisel points 28 chiseling or gouging slots into the wall of the hole to place the elongate, sharp parallel edges 20 in secure gripping position on the gouged or chiseled inner wall of the tube, with no or negligible expansion of the stud.

The square blade 30 may be used on extremely small sizes, such as small bolts or screws, in the same manner, with the four chisel cutting edges 48 and chisel points 50 causing the four sharp elongate parallel edges 34 to secure the inside of the small stud and enable it to be readily removed in the same manner, without damage to the threads 44. In both cases, it is the hollow ground sides of the extractor that make the elongate parallel edges sharp and better gripping of the stud when forced therein.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A broken threaded stud extractor comprising a shank, an elongate rectangular blade integrally extending from said shank, each rectangular side of said blade being hollow ground to a concave surface, said concave side surfaces meeting in sharp, longitudinally extending parallel edges parallel to the axis of said blade, said blade terminating in oppositely disposed chisel cutting edges and chisel cutting points, said chisel cutting edges extending transversely of the longitudinal axis of said blade, said chisel cutting points each being the terminus of one of said sharp, longitudinally extending parallel edges, the terminal surface of said blade between two opposed chisel cutting edges being recessed.

2. The extractor of claim 1, said blade having two of its rectangular sides shorter than the other two of its rectangular sides, said chisel edges being located at the ends of said two narrower sides.

3. The extractor of claim 1, said recessed terminal surface comprising two surfaces diverging from each other and forming an acute angle with said chisel edges, said two diverging terminal surfaces meeting each other in a smooth curve.

4. The extractor of claim 1, said blade being square in cross section.

5. The extractor of claim 4, said recessed terminal surface being concave.

References Cited by the Examiner

UNITED STATES PATENTS

| | | | |
|---|---|---|---|
| 1,992,726 | 2/35 | Tautz | 145—24 |
| 2,066,132 | 12/36 | Zihler | 81—71 X |
| 2,121,197 | 6/38 | Jackman | 81—71 |
| 2,176,626 | 10/39 | Gentry | 145—240 X |

FOREIGN PATENTS

| | | |
|---|---|---|
| 140,034 | 7/34 | Austria. |
| 118,578 | 4/47 | Sweden. |

WILLIAM FELDMAN, *Primary Examiner.*

JAMES L. JONES Jr., *Examiner.*